Nov. 22, 1927. R. W. SCOTT

STOCKING AND THE MANUFACTURE THEREOF

Re. 16,795

Original Filed Jan. 14, 1925

INVENTOR.
Robert W. Scott
by his attorneys
Howson and Howson

Reissued Nov. 22, 1927.

Re. 16,795

UNITED STATES PATENT OFFICE.

ROBERT W. SCOTT, OF BABYLON, NEW YORK, ASSIGNOR TO SCOTT AND WILLIAMS, INC., OF NEW YORK, N. Y., A CORPORATION OF MASSACHUSETTS.

STOCKING AND THE MANUFACTURE THEREOF.

Original No. 1,637,244, dated July 26, 1927, Serial No. 2,407, filed January 14, 1925. Application for reissue filed October 6, 1927. Serial No. 224,510.

My invention relates to seamless stockings such as are usually produced upon circular knitting machines and are provided with seamless heels and toes, the object of my invention being to produce a more acceptable stocking of this type than those now made and also to effect economy in such production, especially when a portion of the stocking is reinforced, or, as it is usually termed, "spliced" by feeding an extra yarn or yarns to certain of the needles, as, for instance, to those employed in knitting the rear portion of the ankle, the sole and the toe of the stocking.

In the accompanying drawing—

Figure 2:
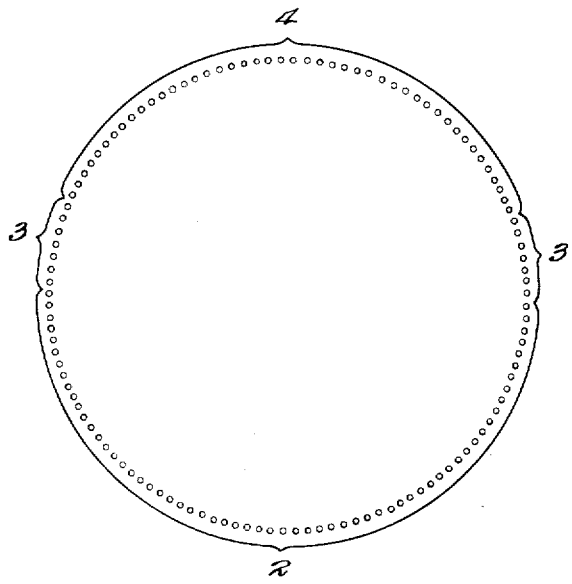
Figure 1:
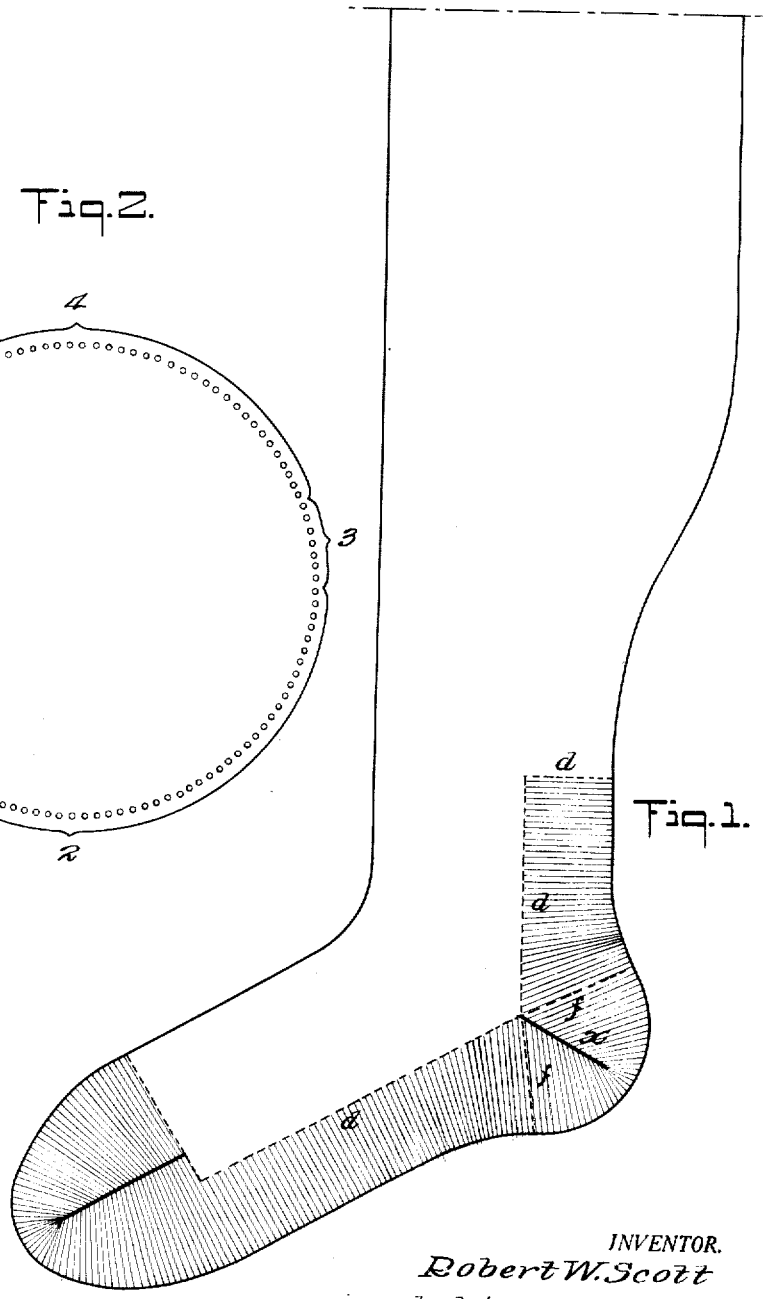

Figure 1 is a side view of the foot and ankle portions of a stocking produced in accordance with my invention, and Figure 2 is a diagram of the circle of needles upon which the stocking is knitted.

The ordinary method of knitting a seamless stocking upon a circular knitting machine is to start the knitting upon all of the needles of the machine and to produce tubular web, by round-and-round knitting upon said needles, until the point is reached at which the heel is to be produced, whereupon that half of the circle of needles of the machine which corresponds to the instep portion of the web is thrown out of action but retaining their loops, and to-and-fro knitting is conducted upon the remaining needles, with alternate narrowing and widening of the web, the effect being to produce upon the rear half of the tubular leg web a pocket having on each side tapered webs united on the diagonal line $x$ extending from the upper corner of the pocket down towards the center of the back of the same.

The heel pocket being completed, the instep half of the needles are restored to action again and round-and-round knitting is resumed for the production of the foot web of the stocking, and upon the completion of said foot web a seamless toe pocket is formed upon the front end of the same by a method of knitting similar to that resorted to for the production of the heel, the terminal stitches around the mouth of this toe pocket being then united to the terminal stitches at the front end of the instep web of the foot in order to close the toe and complete the stocking.

In case it is desired to strengthen or reinforce the rear of the ankle, the heel, the sole and toe portions of the stocking one or more reinforcing yarns are supplied to that half of the needles employed in knitting these portions, or said needles are supplied with a heavier yarn than that supplied to the needles which knit the instep portion of the foot and ankle webs of the stocking.

In the knitting of women's fine gage stockings, however, the heel pocket formed upon the knitted tube in the manner described, is apt to be too large. It is only by keeping the quantity of yarn down close to the danger point and knitting the heel inordinately stiff that even a fair appearing stocking can be made in these fine gages.

In carrying out my invention, I knit a much smaller heel than usual by using for the production of said heel considerably less than one-half of the circle of needles of the cylinder and by restricting the to-and-fro knitting for the production of the heel to this limited number of needles.

The needles of the machine are, as shown in Fig. 2, divided into three sets 2, 3 and 4, the needles 2 extending around one half of the cylinder, the needles 4 comprising those within restricted segment on the other half of the cylinder, and the needles 3 comprising those between the needles 2 and 4 at each side of the cylinder. To facilitate manipulation of these needles they are preferably provided with butts of different length, the needles 4 having low butts, the needles 2 having high butts, and the needles 3 having butts of intermediate length.

When the tubular leg web of the stocking has been produced by round-and-round knitting upon all of the needles up to the point at which the heel is to be formed the needles 2 and 3 are put out of action and the heel is then formed in the usual way by to-and-fro knitting and alternate narrowing and widening upon the needles 4, the line of union or suture between the webs being correspondingly shortened. Upon the completion of the heel all of the needles are rendered active again and round-and-round knitting is resorted to for the production of the tubular foot web, and after the completion of the same the needles 2 are put out of action, the needles 3 and 4 around the other half of the machine being permitted to remain in action and to-and-fro knitting with alternate narrowing and widening of the web being conducted upon this half of the needles for the formation of the toe pocket.

When the web is reinforced or spliced in the rear portion of the ankle, the heel and the sole portion of the foot, the reinforcing yarn, during the knitting of these portions, may be applied only to the needles 4, or may extend one or a few needles beyond the corner of the heel joint into the instep portion, as is usual, in order to strengthen said corner, the outline of the reinforced portions of the sole and ankle being represented by the dotted lines *d* in Fig. 1 and the outline of the heel by the dotted lines *f*.

The spliced wales of the sole thus substantially correspond in number to the number of wales presented at the front half of the heel, and the spliced wales at the rear half of the ankle substantially correspond to the number of wales presented at the top of the heel.

I am thus enabled to produce the desired small heel on the stocking, and the spliced area in the sole does not rise so high as to be exposed above the top of a low shoe, nor does it extend so far forward on each side of the ankle as to be objectionable, neither does the top of the heel show above a low shoe, or the point extend forward far enough to be objectionable.

The toe of the stocking however is knit on half the circle of needles as usual and spliced accordingly, as indicated in the drawing, so that this spliced toe is larger than the spliced heel.

It will be evident that, owing to the lesser number of needles than usual employed in knitting the spliced portions of my stocking, a lesser amount of splicing yarn than usual will be required and the resulting economy is not to be ignored.

Moreover, the ordinary stocking for women's wear, as produced by a circular knitting machine, is wider than it should be in the foot portion in order that it shall be sufficiently wide in the leg portion, and the stockings are subsequently stretched upon a shaping and drying form to aid in imparting the desired swell to the calf portion of the leg. This form also measurably contracts the diameter of the foot by stretching the same lengthwise, but even so, the foot portion of the finished stocking is wider than that of a standard "full fashioned" stocking.

When the stocking is provided with a small heel and contracted spliced area in accordance with my invention, the whole foot portion is narrower than when made in the usual manner, because in my improved stocking the area made of reinforced stitches,—which each necessarily occupies a greater space than a corresponding plain stich—is less than usual. Where I use the word "reinforced", I mean either adding a yarn or yarns or changing to a heavier yarn.

What I claim is:

1. A seamless stocking having a reinforced heel pocket knit narrowed and widened with the wales of the narrowed and widened sections occupying less than one half the circumference of the stocking tube at the angle.

2. The mode herein described of knitting a stocking upon a circular knitting machine, said mode consisting in first producing the leg portion of the stocking by round-and-round knitting upon all of the needles, then putting out of action needles around one half of the machine and also a group of needles adjoining the same at each side of the machine, then producing the heel by to-and-fro knitting and narrowing and widening upon the remaining restricted segment of needles, then reintroducing the needles originally put out of action and producing the foot web by round-and-round knitting.

3. The mode herein described of knitting a stocking upon a circular knitting machine, said mode consisting in first producing the leg portion of the stocking by round-and-round knitting upon all of the needles, then putting out of action needles around one half of the machine and also a group of needles adjoining the same at each side of the machine, then producing the heel by to-and-fro knitting and narrowing and widening upon the remaining restricted segment of needles, then reintroducing the needles originally put out of action and producing the foot web by round-and-round knitting, then putting out of action needles around one half of the machine as before, and then producing the toe by to-and-fro knitting and narrowing and widening upon the remaining half of the needles.

4. A stocking having a reinforced seamless heel pocket knit narrowed and widened with a lesser number of wales on the narrowed and widened sections which form the heel pocket than on the instep side of the stocking at the ankle.

5. A seamless stocking having a reinforced seamless heel pocket, the number of wales from the inner end of the diagonal suture of the heel on one side to the inner end of the diagonal suture on the other side being less around the point of the heel than across the instep.

6. In a process for knitting a stocking foot on a circular knitting machine the step of inserting a heel pocket between the leg and the foot by narrowed and widened to-and-fro knitting on less than half the circle of needles.

SCOTT & WILLIAMS INC. [L. S.]
By H. SWINGLEHURST,
*President.*

DISCLAIMER

REIS. 16,795.—*Robert W. Scott*, Babylon, N. Y. STOCKING AND THE MANUFACTURE THEREOF. Patent dated November 22, 1927. Disclaimer filed February 11, 1930, by the assignee, *Scott & Williams, Incorporated.*

Hereby enters this disclaimer to such broad interpretation of the claims of the said reissued patent as might construe them to read upon stockings knit with ribbed or mock-ribbed instep, this invention being limited to stockings in which the heel and the instep at the ankle are both of plain knitting.

[*Official Gazette March 4, 1930.*]